United States Patent [19]
Fukushima et al.

[11] Patent No.: US 6,289,416 B1
[45] Date of Patent: Sep. 11, 2001

[54] DISK DRIVE DEVICE AND A METHOD FOR CONTROLLING THE SAME

[75] Inventors: Yukio Fukushima, Setagaya-ku; Toshio Kakihara; Kazushige Okutsu, both of Fujisawa; Tetsuo Ueda, Sagamihara, all of (JP)

[73] Assignee: International Business Machines Corporation, Armonk, NY (US)

[*] Notice: Subject to any disclaimer, the term of this patent is extended or adjusted under 35 U.S.C. 154(b) by 0 days.

[21] Appl. No.: 09/139,933

[22] Filed: Aug. 26, 1998

[30] Foreign Application Priority Data

Aug. 26, 1997 (JP) .................................................... 9-229687

[51] Int. Cl.[7] ............................. G06F 12/08; G06F 13/00
[52] U.S. Cl. .............................. 711/113; 710/56; 714/15; 714/25; 714/704; 714/718
[58] Field of Search ................................. 714/704, 718, 714/719, 15, 25; 710/56; 711/113

[56] References Cited

U.S. PATENT DOCUMENTS

| 5,825,729 | * | 10/1998 | Ogasawara et al. | ............. | 369/44.27 |
| 6,016,547 | * | 1/2000 | Ono | ..................................... | 713/300 |
| 6,029,231 | * | 7/2000 | Sze | ..................................... | 714/758 |

* cited by examiner

*Primary Examiner*—Matthew Kim
*Assistant Examiner*—Pierre H. Vital
(74) *Attorney, Agent, or Firm*—Altera Law Group, LLC (57) ABSTRACT The present invention provides a disk drive device containing a cache memory having K queue entries (K is an integer) to operate in a write cache mode and a method for controlling the disk drive device. The number of the queue entries to be used in the write cache mode can be gradually decreased from the number K to a decreased number by a predetermined number, and the number of the queue entries to be used in the write cache mode can be gradually increased from the decreased number towards the number K by a predetermined number, in response to values of parameters, such as an error rate and Non Repeatable Run Out or Repeatable Run Out of the rotating data recording disk at writing of data from the cache memory to a rotating data recording disk.

20 Claims, 7 Drawing Sheets

CACHE MEMORY 21

| QUEUE ENTRY | LBA | LENGTH | DATA |
|---|---|---|---|
| #1 | XXX | XXX | #1 DATA |
| #2 | XXX | XXX | #2 DATA |
| #3 | XXX | XXX | #3 DATA |
| #4 | XXX | XXX | #4 DATA | (*)
| #5 | XXX | XXX | #5 DATA | (*)
| #6 | XXX | XXX | #6 DATA |
| #7 | | | |
| #8 | | | |
| #9 | | | |
| #10 | | | |
| #11 | | | |
| #12 | | | |
| #13 | | | |
| #14 | | | |
| #15 | | | |
| #16 | | | |

ORIGINAL QUEUE DEPTH (K=16)
SECOND QUEUE DEPTH
THIRD QUEUE DEPTH
X = 6
X = 9

*Fig. 7A*

CACHE MEMORY 21

| QUEUE ENTRY | LBA | LENGTH | DATA |
|---|---|---|---|
| #1 | XXX | XXX | #5 DATA |
| #2 | XXX | XXX | #6 DATA |
| #3 | | | |
| #4 | | | |
| #5 | | | |
| #6 | | | |
| #7 | | | |
| #8 | | | |
| #9 | | | |
| #10 | | | |
| #11 | | | |
| #12 | | | |
| #13 | | | |
| #14 | | | |
| #15 | | | |
| #16 | | | |

DISK DRIVE DEVICE AND A METHOD FOR CONTROLLING THE SAME

BACKGROUND OF THE INVENTION

1. Field of the Invention

The invention relates to a disk drive device and a method for controlling the disk drive device for performing an improved write cache operation, and relates to a memory device and a method for controlling the memory device for performing the improved write cache operation.

2. Description of Related Art

In a hard disk drive device connected to a host processor through an interface, a write cache scheme has been used to save a processing time of the host processor. Describing the write cache scheme, when the hard-disk drive device is powered on, a main control circuit or MPU of the hard disk drive device enters into a POR (Power On Reset) status, and then enters into an initializing status in which many preparations for a read/write operation are made, e.g., a switching of a "write cache" status to an enable status. This status is called "write cache enable".

Figure 1:
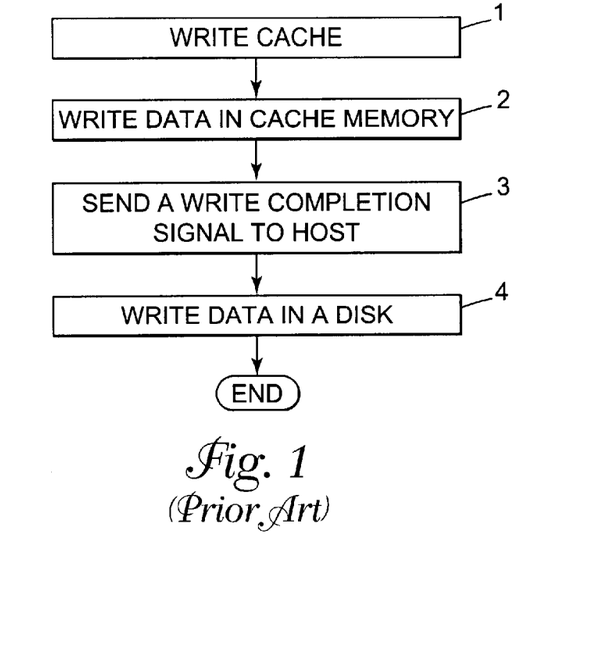
FIG. 1 is a flow chart showing the write cache operation.

An operation of the MPU in the write cache enable status is represented by a block 1 shown in FIG. 1, in which the MPU waits for a write command and data sent from the host processor, and when the write command and data are received, the MPU stores the data in a cache memory, as shown in a block 2 in FIG. 1. The MPU then sends a write completion signal to the host processor through the interface, as shown in a block 3. The operation proceeds to a block 4, in which the MPU writes the data cached in the cache memory into the rotating data recording disk, such as a magnetic recording disk. The operation proceeds to an end block 5 to terminate the write cache operation. As described above, the MPU sends the write completion signal to the host processor before actually storing the data in the rotating data recording disk, so that the processing time of the host processor is saved.

Japanese patent application JP-A-8-77728 discloses a write cache scheme of a disk drive device connected to a host processor in which each time the disk drive device receives a write command from the host processor, a determination is made as to whether the write cache operation should be made. To this end, each time the write command is received, a cache monitor circuit monitors various parameters to determine as to whether the write cache mode should be turned ON or OFF. The parameters monitored by the cache monitor circuit are an error rate of an error correction circuit, an error rate at a verifying operation, a probability of occurrence of servo errors, etc. Japanese patent application JP-A-8-77728 is directed to control only the switching of the write cache mode ON or OFF, and does not discloses a control of a queue depth of the present invention.

A problem of the write cache scheme of the patent application JP-A-8-77728 is that the cache monitor circuit monitors the above various parameters to determine as to whether the write cache mode should be turned ON or OFF, each time the write command is sent from the host processor. It means that a command overhead is increased, and a write cache completion signal is sent to the host processor after a delay which is required to perform the operation of the cache monitor circuit, so that the processing time of the host processor is wasted.

It can be seen then that there is a need for a cache and method for caching that does not increase overhead or delays.

SUMMARY OF THE INVENTION

To overcome the limitations in the prior art described above, and to overcome other limitations that will become apparent upon reading and understanding the present specification, the present invention discloses a disk drive device containing a cache memory having K queue entries (K is an integer) to operate in a write cache mode and a method for controlling the disk drive device in which the number of the queue entries to be used in the write cache mode can be gradually decreased from the number K to a number decreased by a predetermined number, and the number of the queue entries to be used in the write cache mode can be gradually increased from the decreased number towards the number K by a predetermined number, in response to values of parameters, such as an error rate and Non Repeatable Run Out or Repeatable Run Out of the rotating data recording disk at writing of data from the cache memory to a rotating data recording disk.

Other embodiments of a system in accordance with the principles of the invention may include alternative or optional additional aspects. One such aspect of the present invention is that a method for controlling a disk drive device containing a rotating data recording disk and a cache memory which includes K queue entries, wherein K is an integer, for storing data sent from a host processor, includes detecting that N queue entries in the cache memory store the data, wherein N is equal to or smaller than K, and N is an integer, successively writing the data stored in the N queue entries into the rotating data recording disk, detecting that an error rate at the writing of the data exceeds a predetermined level, and decreasing the K queue entries by a predetermined number X, wherein X is equal to or less than K−N, and X is an integer.

Another aspect of the present invention is that the detecting detects that an error rate at the writing of the data exceeds a predetermined level, and that Non Repeatable Run Out or Repeatable Run Out of the rotating data recording disk at the writing of the data exceeds a predetermined level.

Another aspect of the present invention is that a method for controlling a disk drive device containing a rotating data recording disk and a cache memory which includes K queue entries, wherein K is an integer, for storing data sent from a host processor includes detecting that at least one queue entry in the cache memory stores the data, writing the data stored in the queue entry into the rotating data recording disk, detecting an occurrence of error at the writing of the data, performing one of error recovery steps for the data, and rewriting the data into the rotating data recording disk, detecting that an error rate at the rewriting of the data into the rotating data recording disk exceeds a predetermined level, and decreasing the K queue entries by a predetermined number X, wherein X is equal to or less than K−N, N is the number of queue entries into which the data are stored, and N and X are integer.

Another aspect of the present invention is that the detecting detects that an error rate at the rewriting of the data exceeds a predetermined level, and that Non Repeatable Run Out or Repeatable Run Out of the rotating data recording disk at the rewriting of the data exceeds a predetermined level.

Yet another aspect of the present invention is that a method for controlling a disk drive device containing a rotating data recording disk and a cache memory which includes a plurality of queue entries for storing data sent from a host processor, to operate in a write cache mode includes detecting that at least one queue entry in the cache memory stores the data, writing the data stored in the queue entry into a target sector of the rotating data recording disk, detecting an occurrence of error at the writing of the data into the target sector, performing one of error recovery steps for the data and rewriting the data into the target sector, detecting that all error recovery steps are performed for the data, and that the rewriting of the data into the target sector fails, writing the data into an alternative sector of the rotating data recording disk, detecting that the writing of the data into the alternative sector succeeds, detecting that Non Repeatable Run Out or Repeatable Run Out of the rotating data recording disk exceeds a predetermined level, and informing the host processor of that a status of the disk drive device is switched to a status in which the disk drive device does not operate in the write cache mode.

Another aspect of the present invention is that a method for controlling a disk drive device containing a rotating data recording disk and a cache memory which includes a plurality of queue entries for storing data sent from a host processor, to operate in a write cache mode includes detecting that at least one queue entry in the cache memory stores the data, writing the data stored in the queue entry into a target sector of the rotating data recording disk, detecting an occurrence of error at the writing of the data in the target sector, performing one of error recovery steps for the data and rewriting the data into the target sector, detecting that all error recovery steps are performed for the data, and that the rewriting of the data into the target sector fails, writing the data into an alternative sector of the rotating data recording disk, detecting that the writing of the data into the alternative sector fails, rewriting the data into the target sector, detecting that the rewriting of the data into the target sector in the rewriting succeeds, and informing the host processor of that a status of the disk drive device is switched to a status in which the disk drive device does not operate in the write cache mode.

Another aspect of the present invention is that a method for controlling a disk drive device containing a rotating data recording disk and a cache memory which includes K queue entries (K is an integer) for storing data sent from a host processor includes detecting that N queue entries in the cache memory store the data, wherein N is equal to or smaller than K, and N is an integer, successively writing the data stored in the N queue entries into the rotating data recording disk, detecting that an error rate at the writing of the data exceeds a predetermined level, decreasing the K queue entries by a predetermined number X, wherein X is equal to or less than K–N, and X is an integer, and detecting that a command to be processed does not exist, and starting an idle mode. wherein the idle mode includes detecting that the K queue entries are decreased by at least the predetermined number X, writing test data in a region for test in the rotating data recording disk, detecting that the writing of the test data succeeds, and increasing the number of the decreased queue entries by a predetermined number.

Another aspect of the present invention is that idle mode is repeated until the number of the decreased queue entries are restored to the K queue entries.

Another aspect of the present invention is that the detecting detects that an error rate at the writing of the data exceeds a predetermined level, and that Non Repeatable Run Out or Repeatable Run Out of the rotating data recording disk at the writing of the data exceeds a predetermined level.

Another aspect of the present invention is that a disk drive device containing a rotating data recording disk and a cache memory which includes K queue entries (K is an integer) for storing data sent from a host processor includes a detector for detecting that N queue entries in the cache memory store the data, wherein N is equal to or smaller than K, and N is an integer, a write circuit for successively writing the data stored in the N queue entries into the rotating data recording disk, a error rate detector for detecting that an error rate at the writing of the data exceeds a predetermined level, and a subtractor for decreasing the K queue entries by a predetermined number X, wherein X is equal to or less than K–N, and X is an integer.

Another aspect of the present invention is that the error rate detector detects that an error rate at the writing of the data exceeds a predetermined level, and that Non Repeatable Run Out or Repeatable Run Out of the rotating data recording disk at the writing of the data exceeds a predetermined level.

Another aspect of the present invention is that a disk drive device containing a rotating data recording disk and a cache memory which includes K queue entries, wherein K is an integer, for storing data sent from a host processor includes a detector for detecting that at least one queue entry in the cache memory stores the data, a write circuit for writing the data stored in the queue entry into the rotating data recording disk, an error detector for detecting an occurrence of error at the writing of the data, error recovery circuit for performing one of error recovery steps for the data, and rewriting the data into the rotating data recording disk, an error rate detector for detecting that an error rate at the rewriting of the data into the rotating data recording disk exceeds a predetermined level, and a subtractor for decreasing the K queue entries by a predetermined number X, wherein X is equal to or less than K–N, N is the number of queue entries into which the data are stored, and N and X are integer.

Another aspect of the present invention is that a disk drive device containing a rotating data recording disk and a cache memory which includes a plurality of queue entries for storing data sent from a host processor, to operate in a write cache mode includes a detector for detecting that at least one queue entry in the cache memory stores the data, a write circuit for writing the data stored in the queue entry into a target sector of the rotating data recording disk, an error detector for detecting an occurrence of error at the writing of the data into the target sector, an error recovery circuit for performing one of error recovery steps for the data and rewriting the data into the target sector, a recovery detector for detecting that all error recovery steps are performed for the data, and that the rewriting of the data into the target sector fails, a write circuit for writing the data into an alternative sector of the rotating data recording disk, a write success detector for detecting that the writing of the data into the alternative sector succeeds, a threshold detector for detecting that Non Repeatable Run Out or Repeatable Run Out of the rotating data recording disk exceeds a predetermined level, and a processor sensor for informing the host processor of that a status of the disk drive device is switched to a status in which the disk drive device does not operate in the write cache mode.

Another aspect of the present invention is that a disk drive device containing a rotating data recording disk and a cache memory which includes a plurality of queue entries for storing data sent from a host processor, to operate in a write cache mode includes a detector for detecting that at least one queue entry in the cache memory stores the data, a write circuit for writing the data stored in the queue entry into a target sector of the rotating data recording disk, an error detector for detecting an occurrence of error at the writing of the data in the target sector, an error recovery circuit for performing one of error recovery steps for the data and rewriting the data into the target sector, an error recovery detector for detecting that all error recovery steps are performed for the data, and that the rewriting of the data into the target sector fails, a write circuit for writing the data into an alternative sector of the rotating data recording disk, a write failure detector for detecting that the writing of the data into the alternative sector fails, a rewrite circuit for rewriting the data into the target sector, a rewrite success detector for detecting that the rewriting of the data into the target sector in the rewriting succeeds, and a processor sensor for informing the host processor of that a status of the disk drive device is switched to a status in which the disk drive device does not operate in the write cache mode.

Another aspect of the present invention is that a disk drive device containing a rotating data recording disk and a cache memory which includes K queue entries, wherein K is an integer, for storing data sent from a host processor includes a detector for detecting that N queue entries in the cache memory store the data, wherein N is equal to or smaller than K, and N is an integer, a write circuit for successively writing the data stored in the N queue entries into the rotating data recording disk, an error rate detector for detecting that an error rate at the writing of the data exceeds a predetermined level, a subtractor for decreasing the K queue entries by a predetermined number X, wherein X is equal to or less than K–N, and X is an integer, and a processor sensor for detecting that a command to be processed does not exist, and starting an operation of an idle mode device, wherein the idle mode device comprises a K queue entry detector for detecting that the K queue entries are decreased by at least the predetermined number X, a write test data circuit for writing test data in a region for test in the rotating data recording disk, a success detector for detecting that the writing of the test data succeeds, an incrementor for increasing the number of the decreased queue entries by a predetermined number.

Another aspect of the present invention is that the idle means device operate until the number of the decreased queue entries are restored to the K queue entries.

Another aspect of the present invention is that the error rate detector detects that an error rate at the writing of the data exceeds a predetermined level, and that Non Repeatable Run Out or Repeatable Run Out of the rotating data recording disk at the writing of the data exceeds a predetermined level.

Another aspect of the present invention is that a method for controlling a memory device containing a data recording medium and a cache memory which includes K queue entries (K is an integer) for storing data sent from a host processor, includes detecting that N queue entries in said cache memory store said data, wherein N is equal to or smaller than K, and N is an integer, successively writing said data stored in said N queue entries into said data recording medium, detecting that an error rate at said writing of said data exceeds a predetermined level, and decreasing said K queue entries by a predetermined number X, wherein X is equal to or less than K–N, and X is an integer.

Another aspect of the present invention is that a memory device containing a data recording medium and a cache memory which includes K queue entries, wherein K is an integer, for storing data sent from a host processor, includes a N queue entry detector for detecting that N queue entries in said cache memory store said data, wherein N is equal to or smaller than K, and N is an integer, a write circuit for successively writing said data stored in said N queue entries into said data recording medium, an error rate detector for detecting that an error rate at said writing of said data exceeds a predetermined level, and a subtractor for decreasing said K queue entries by a predetermined number X, wherein X is equal to or less then K–N, and X is an integer.

These and various advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

The present invention is illustrated by way of example and not limitation in the figures of the accompanying drawings, in which like references indicate similar elements, and in which.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Figure 2:
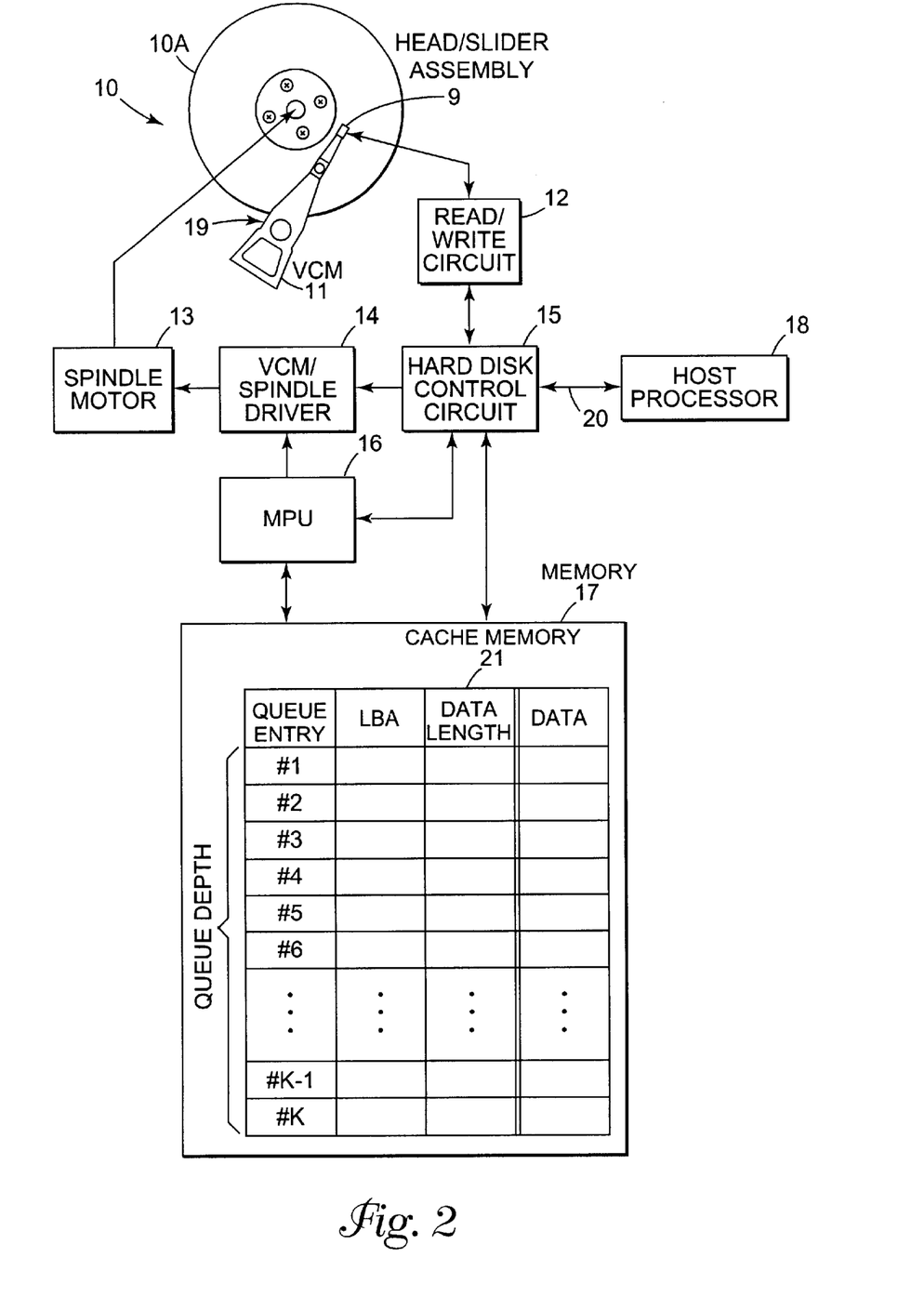
FIG. 2 is a block diagram of the hard disk drive device operated in accordance with the present invention.

FIG. 2 shows a block diagram of a hard disk drive device operated in accordance with the present invention. Data are written in or read from a data track on a data recording surface 10A of a magnetic recording disk or a rotating data recording disk 10 by a read/write head mounted in a head/slider assembly 9. The magnetic recording disk 10 is rotated by a spindle motor 13. A supporting arm 19 for supporting the head/slider assembly 9 is moved in a radial direction of the magnetic recording disk 10 by a voice coil motor (VCM) 11. The spindle motor 13 and the VCM 11 are controlled by a VCM/spindle driver 14. A read/write circuit 12 is connected to the read/write head to control the read/write operation of the data. A hard disk control circuit 15 is connected to the read/write circuit 12, the VCM/spindle driver 14 and a memory 17. The memory 17 contains a cache memory 21 and other data area, such as a RAM area, not shown, for storing control programs down loaded from special data tracks of the data recording disk 10 during the initializing period.

The cache memory 21 contains K queue entries (K is an integer), and operates as a first in first out (FIFO) register. It is assumed that K=16 for simplifying the description. Each of the queue entries contains an area for storing a logical block address (LBA) on the data recording surface 10A into which the data are recorded, an area for storing a data length information indicating a length of the data recorded in a particular logical block address, and a data area for storing the data. The write command, the data, the logical block address and the data length information are sent from a host processor 18 to the hard disk control circuit 15 through an interface 20. The number of queue entries used in the write cache operation is called a queue depth. Thus, the cache memory 21 has an original queue depth represented by K=16. A main control circuit or MPU 16 controls the operation of the VCM/spindle driver 14, the hard disk control circuit 15, the memory 17 and the cache memory 21. The hard disk control circuit 15 is connected to the host processor 18 through the interface 20.

Figure 3:
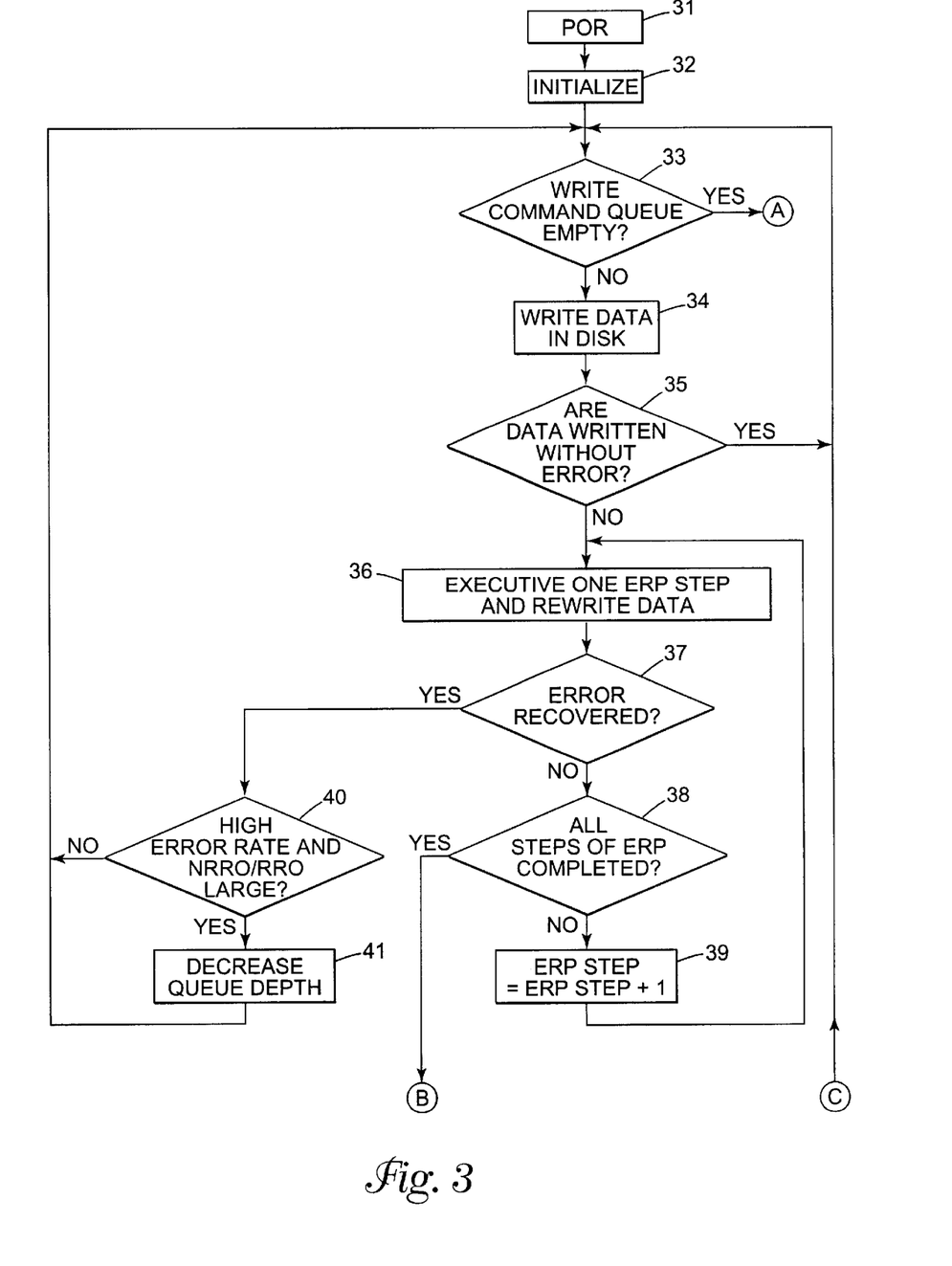
FIG. 3 is a flow chart showing the operation in accordance with the present invention.
Figure 4:
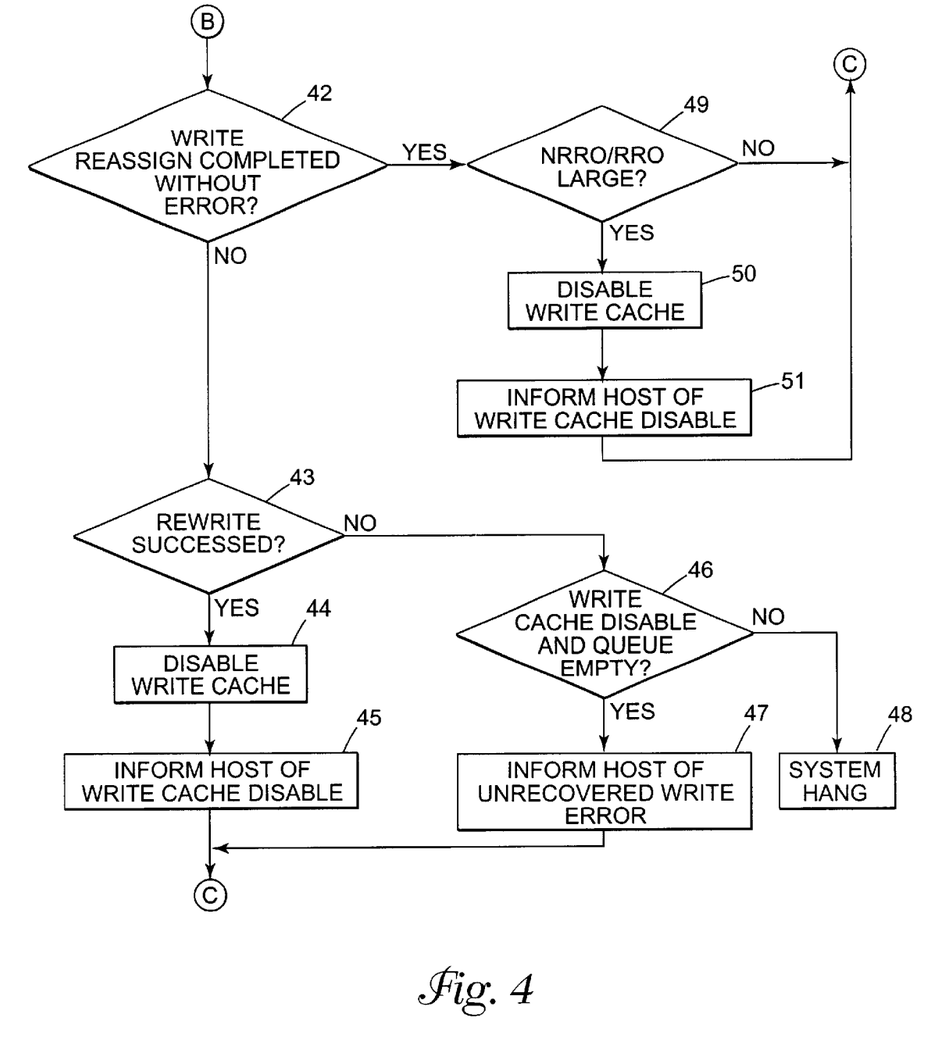
FIG. 4 is a flow chart showing the operation in accordance with the present invention.
Figure 5:
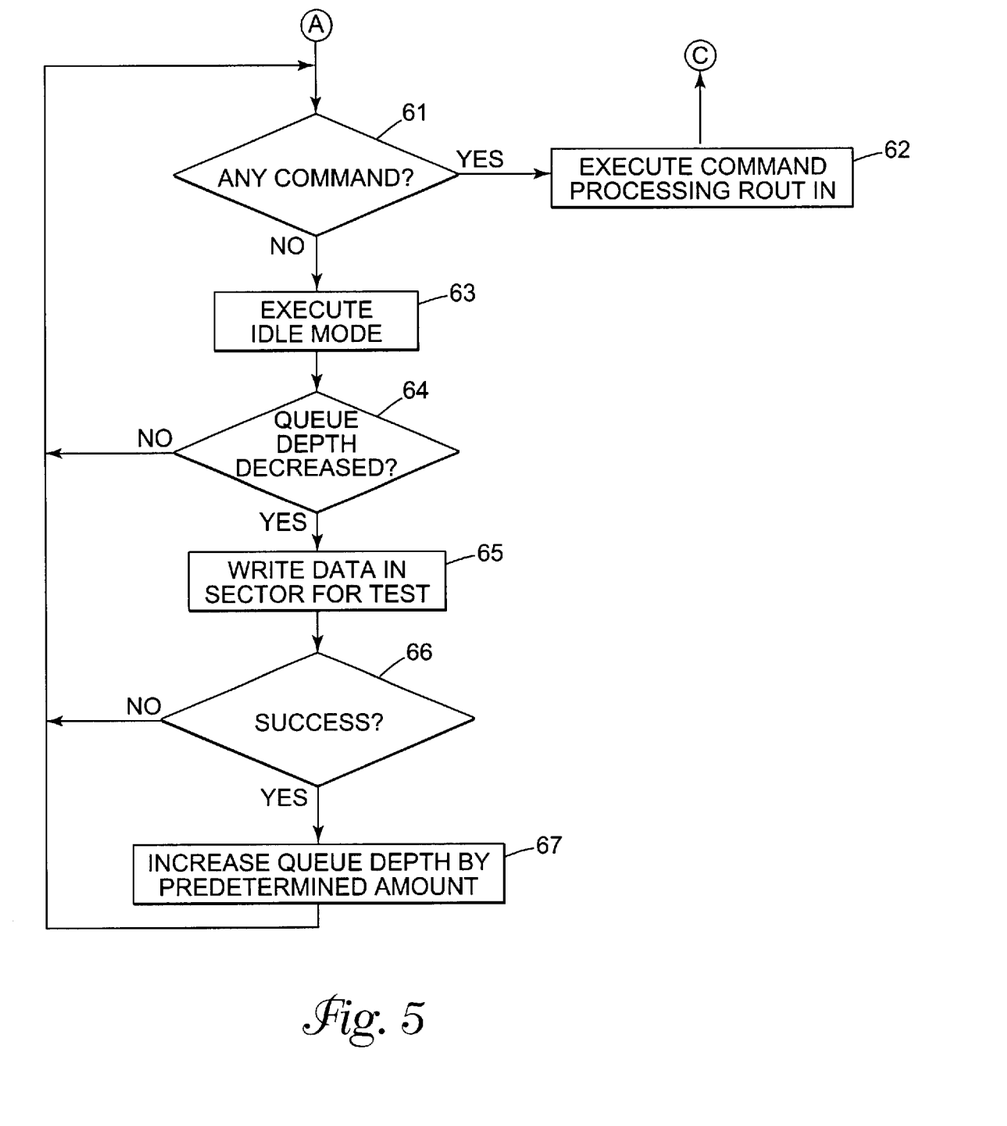
FIG. 5 is a flow chart showing the operation in accordance with the present invention.

FIGS. 3, 4 and 5 show the flow charts of the operation in accordance with the present invention. When a power to the hard disk drive device is turned on, the operation enters into a POR (Power On Reset) status shown in a block 31 in FIG. 3. The operation proceeds to a block 32 in which many operational parameters of the hard disk drive device are initialized. In the operation of the block 32, a control signal "write cache" is switched to an enable status which is called "write cache enable", and the queue depth is set to the maximum value, i.e. K=16, so that the hard disk drive device operates in the write cache mode. Another operation such as the down load of the control programs is performed in the block 32.

Figure 6:
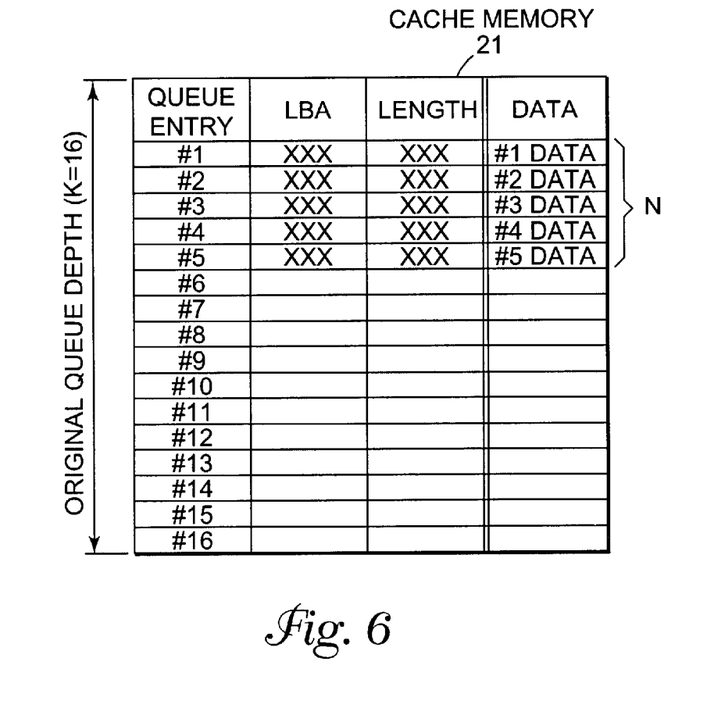
FIG. 6 is an example of content of the cache memory in the operation in accordance with the present invention.

For example, it is assumed that after the initializing step of the block 32, five write commands each of which contains the data, the logical block address and the data length information, are sent from the host processor 18 to the hard disk drive device. When a first write command, a first data, a logical block address of the data recording surface 10A into which the first data should be stored and a data length information of the first data are sent from the host processor 18 to the hard disk drive circuit 15 through the interface 20, the MPU 16 stores the first data, the logical block address and the data length information in the first queue entry #1, as shown in FIG. 6, and sends a write command completion signal to the host processor 18. When a second write command, a second data, its logical block address and its data length information are sent from the host processor 18, the MPU 16 stores the second data, the logical block address and the data length information in the second queue entry #2, as shown in FIG. 6, and sends a write command completion signal to the host processor 18. When a third write command, a third data, its logical block address and its data length information are sent from the host processor 18, the MPU 16 stores the third data, the logical block address and the data length information in the third queue entry #3, as shown in FIG. 6, and sends a write command completion signal to the host processor 18, and so on. Thus, the data, the logical block addresses and the data length information are stored in the #1 through #5 queue entries, as shown in FIG. 6.

The operation proceeds to a block 33 in which the MPU 16 determines as to whether the write command queue is empty, or not, that is, as to whether the cache memory 21 is empty, or not. Also, in the block 33, the MPU 16 detects the number of queue entries into which the data, the logical block addresses and the data length information are stored. The number of queue entries into which the data, the logical block addresses and the data length information are stored is represented by N (wherein N is an integer). If the answer of the block 33 is YES, the operation proceeds to a block 61 shown in FIG. 5, latter described. In the exemplary case, the answer of the block 33 is NO since the five data, i.e. the first data through fifth data, have been cached in the data area of the queue entries #1 through #5 of the cache memory 21. The operation proceeds to a block 34 in which the MPU 16 writes the first data cached in the data area of the queue entry #1 into the logical block address of the data recording surface 10A. The operation proceeds to a block 35 in which the MPU 16 determines as to whether the first data are written without errors, or not. If the data are written with an error(s), this error condition is sensed by the hard disk control circuit 15. It is assumed that the first data through the fifth data are written into the data recording surface 10A without errors. Therefore, the answer of the block 35 is YES, and the operation returns to the block 33. Since the cache memory 21 is the First In First Out register, the second through fifth data are moved into the queue entries #1 through #4, respectively. The answer of the block 33 is NO since the second through the fifth data are stored in the data areas of the queue entries #1 through #4. The operation proceeds to the block 34 to write the second data in the logical address of the data recording surface 10A. The operation proceeds to the block 35 to determine as to whether the second data are written without errors. The answer of the block 35 is YES, and the operation returns to the block 33. And, the operation of the blocks 33 through 35 are repeated to store the remaining third through fifth data in the data recording surface 10A. It is noted that the original or first queue depth including the queue entries #1 through #16 specified in the initializing period of the hard disk drive device is not changed in the operational example 1, since all the data, i.e. the first through fifth data are written in the data recording surface 10A without errors.

Figure 7A:
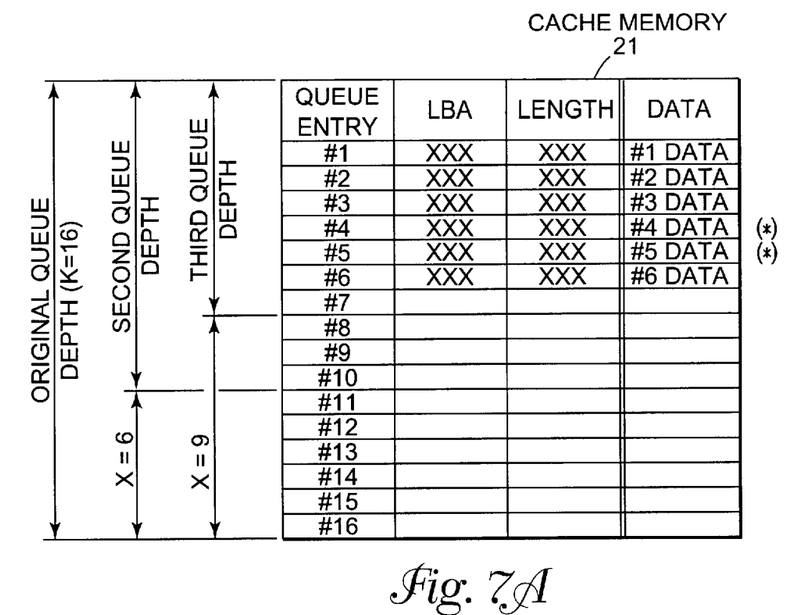
FIG. 7 is an example of content of the cache memory in the operation in accordance with the present invention.

In another example, it is assumed that six write commands each of which contains the data, the logical block addresses and the data length information are sent from the host processor 18 to the hard disk drive device, and the errors occurred when the fourth and fifth data are written in the data recording surface 10A, as marked by (*) in FIG. 7(A). Referring to FIG. 3, the first through third data are written by repeating the operation of the blocks 33, 34 and 35. The fourth through sixth data are moved into the queue entries #1 through #3, respectively. Next, the fourth data are processed in the blocks 33 through 35. However, the answer of the block 35 for the fourth data is NO, and the operation proceeds to a block 36 in which a first step (for example, a step for rewriting the data) of an error recovery procedure (ERP) including 50 steps, for example, is performed and the fourth data is rewritten in the data recording surface 10A. The operation proceeds to a block 37 in which the MPU 16 determines as to whether the errors are recovered, or not. If the answer of the block 37 is NO, the operation proceeds to a block 38 in which the MPU 16 determines as to whether all the steps (50 steps) of the error recovery procedure have been performed, or not. Since the steps of the error recovery procedure are well known in the art, these are not described. If the answer of the block 38 is NO, the operation proceeds to a block 39 in which the step of the error recovery procedure is advanced by one step. The operation returns to the block 36 in which the next step of the error recovery procedure is performed for the fourth data, and the fourth data is rewritten in the data recording surface 10A. The successive error recovery steps are performed in the loop containing the blocks 36 through 39 if the answer of the block 37 is NO.

During the loop operation of the blocks 36 through 39, if the answer of the block 37 becomes YES, that is, the fourth data are written in the data recording surface 10A without an error(s), the operation proceeds to a block 40 in which the MPU 16 determines (a) as to whether an error rate in the write operation performed during a past predetermined time period, such as one hour, exceeds a predetermined level, or not, (b) as to whether an amplitude of Non Repeatable Run Out or Repeatable Run Out (NRRO or RRO) of the rotating data recording disk 10 exceeds a predetermined level, or not, and (c) as to whether the predetermined number of error recovery steps for the fourth data are performed in the loop of the blocks 36 through 39. In the operation of the block 40, the MPU 16 further determine (a') an extent of the error rate exceeding the predetermined level, (b') an extent of the amplitude of the NRRO or RRO of the rotating data recording disk 10 exceeding the predetermined level, and (c') the number of error recovery steps exceeding the predetermined number. The NRRO shown in the block 40 means that the rotating data recording disk 10 is irregularly swung due to a trouble of the spindle motor 13, and the RRO shown in the block 40 means that the data recording disk 10 is regularly and eccentrically swung due to a trouble of the spindle motor 13. The MPU 16 can detects an amplitude of the NRRO or RRO of the rotating data recording disk 10 by monitoring servo signals detected by the read/write head. If the answer of the block 40 is NO, the operation returns to the block 33. In this case, the original or first queue depth (K=16) is not decreased. If the answer of the block 40 is YES, the operation proceeds to a block 41 in which the MPU 16 decrease the original queue depth (K=16) by decreasing the K queue entries by a predetermined number X (X is an integer). Since the number N is equal to or smaller than the total number K, the number X is equal to or less than K−N. One of various values of the X can be selected depending upon the results of the (a'), (b') and (c') in the block 40.

Figure 7B:
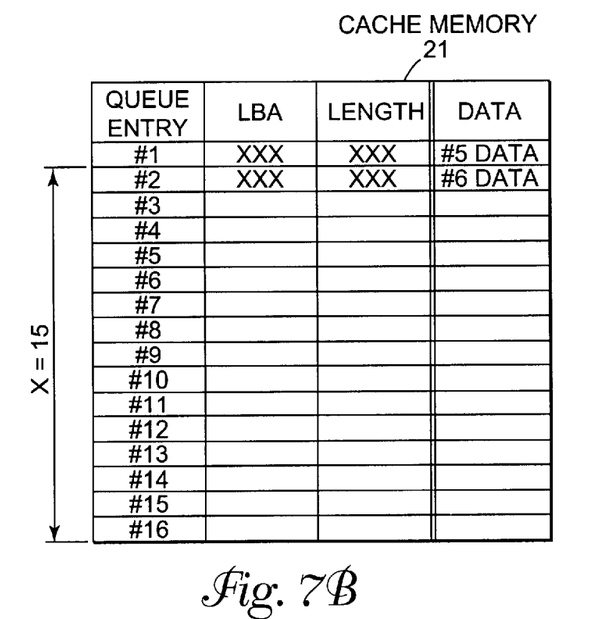

It is assumed that the MPU 16 select X=6 depending upon the results of the (a'), (b') and (c') in the block 40. The original or first queue depth including the queue entries #1 through #16 of the cache memory 21 is decreased to a new or second queue depth including the queue entries #1 through #10 in the block 41. In this case, the MPU 16 allows, in the write cache operation performed after this point of time, the use of only the queue entries #1 through #10 in the cache memory 21, and does not allow the use of the remaining queue entries #11 through #16 in the cache memory 21. It is noted that the following limitation is imposed on the selection of the value of X in the block 40. The fifth and sixth data are stored in the queue entries #1 and #2, after the writing of the fourth data into the data recording surface 10A, as shown in FIG. 7(B), and hence N=2. If the block 40 select a large number X, for example X=15, as the number of queue entries to be decreased, the use of the queue entries #2 through #16 is inhibited after this point of time, so that the sixth data stored in the queue entry #2 is lost. To prevent such undesired loss of the data, the value X is selected to be equal to or less than K−N.

As described above, in the processing of the fourth data stored in the cache memory 21, the MPU 16 specifies the second queue depth including the queue entries #1 through #10. Therefore, in the write cache operation performed after this point of time, the use of the queue entry #1 through #10 is allowed, and the use of the queue entries #11 through #16 is inhibited. Next, the operation returns to the block 33 to process the fifth data stored in the cache memory 21. In the process of the fifth data, the block 35 generates the answer NO, and the error recovery steps in the blocks 36 through 39 are performed, as described before, and if the answer of the lock 37 becomes YES during the error recovery procedure, the operation proceeds to the block 40. As described before, in the block 40, the MPU 16 selects the value of X depending upon the results of the (a), (b) and (c), and further (a') an extent of the error rate exceeding the predetermined level, (b') an extent of the NRRO or RRO of the rotating data recording disk 10 exceeding the predetermined level, and (c') the number of error recovery steps exceeding the predetermined number. If the MPU 16 selects a new value, for example X=9, in the block 40, the block 41 decreases the second queue depth to the third queue depth including the queue entries #1 through #7. The operation returns to the block 33 to process the sixth data stored in the queue entry #1 in the cache memory 21, and the operation of the blocks 33–35 is repeated, and the operation returns to the block 33 in which the MPU 16 determines as to whether the write command queue is empty, or not. At this stage, all the first data through sixth data cached in the cache memory 21 have been written in the data recording surface 10A, and hence the answer of the block 33 is YES, and the operation proceeds to the block 61 in FIG. 5, latter described.

A third example relates to an operational situation in which the answer of the block 38 is YES. This operational situation includes a first, second third cases, as described after. For example, it is assumed in the processing the fifth data shown in FIG. 7, that the answer of the block 38 is YES. It indicates that an error(s) was detected when the fifth data were rewritten in the logical block address (called an original address) of a target sector on the data recording surface 10A, and the error was not recovered even if all the error recovery steps were performed. The operation proceeds to a block 42 shown in FIG. 4 in which the MPU 16 selects an another logical block address in a new or alternative sector on the data recording surface 10A, and tries to write the fifth data into the address in the alternative sector (it is called a write reassign), and determines as to whether the write reassign is completed without an error(s), or not. If the answer of the block 42 is NO, the operation proceeds to a block 43 in which the MPU 16 tries to rewrite the fifth data in the original address of the target sector, and determines as to whether the fifth data are rewritten without errors, or not.

If the answer of the block 43 is YES, it indicates the first case in which the error recovery procedure fails even if all the error recovery steps are performed (blocks 37 and 38), and the write reassign fails (block 42), but the rewrite operation in the block 43 succeeds with difficulty. When the answer of the block 43 is YES, the MPU 16 judges that the write cache operation after this point of time should be inhibited. The operation proceeds to a block 44 in which the write cache status is switched to the disable status. It indicates that the queue depth of the cache memory 21 is decreased to ZERO, since any write cache operation is not performed in the "write cache disable" status. The operation proceeds to a block 45 in which the MPU 16 informs the host processor of that the write cache operation after this point of time is not accepted. The operation returns to the block 33 in FIG. 3 in which the MPU 16 detects the presence of the sixth data in the queue entry #1, and the sixth data are written in the data recording surface 10A by the blocks 34 and 35, and the operation returns to the block 33. It is noted that even if the write cache is disabled in the block 44, the remaining data, i.e. the sixth data are recorded in the data recording surface 10A, as described above.

If the answer of the block 43 is NO, it indicates, in the process of the fifth data, the second case in which the error recovery procedure fails even if all the error recovery steps were performed (blocks 37 and 38), and the write reassign fails (block 42), and the rewrite operation in the block 43 fails. That is, in this second case, the fifth data were not written in the data recording surface 10A. The operation proceeds to a block 46 in which the MPU 16 determines as to whether the write cache mode is in the disable status, and the cache memory 21 is empty, or not. If the answer of the block 46 is NO, the operation proceeds to a block 48 in which the MPU 16 stops all the operation of the hard disk drive device (it is called a self hang). In this case, the fifth data and the sixth data stored in the cache memory 21 are lost, since the write operation of the fifth data fails. The host processor 18 can detects the self hang of the hard disk drive device, since the hard disk drive device does not responds to any command sent from the host processor. If the answer of the block 46 is YES, it indicates that the write cache mode is in the disable status and the data does not exist in the cache memory 21, and the MPU 16 informs the host processor 18 of the occurrence of the unrecovered write error in the hard disk drive device in a block 47. The operation returns to the block 33 in FIG. 3.

If the answer of the block 42 is YES, it indicates, in the process of the fifth data, the third case in which the error recovery procedure fails even if all the error recovery steps are performed (blocks 37 and 38), but the write reassign succeeds (block 42). The operation proceeds to a block 49 in which the MPU 16 determines (b) as to whether an amplitude of the NRRO or RRO of the rotating data recording disk 10 exceeds a predetermined level, or not, and (b') an extent of the NRRO or RRO of the rotating data recording disk 10 exceeding the predetermined level. Since the MPU has already known the fact that the error recovery procedure fails even if all the error recovery steps are performed (blocks 37 and 38), the MPU 16 determines only the (b) and (b'). If the answer of the block 49 is YES, the operation returns to the block 33 in FIG. 3. If the answer of the block 49 is YES, the operation proceeds to a block 50 in which the MPU 16 disables the write cache mode and does not perform any write cache operation after this point of time. It means that the queue depth of the cache memory 21 is decreased to ZERO. The operation proceeds to a block 51 in which the MPU 16 informs the host processor 18 of the write cache disable status. The operation returns to the block 33 shown in FIG. 3 in which the MPU 16 detects the presence of the sixth data in the queue entry #1, and the sixth data are written in the data recording surface 10A by the blocks 34 and 35, and the operation returns to the block 33. It is noted that even if the write cache is disabled as shown in the block 50, the remaining data, i.e. the sixth data are recorded in the data recording surface 10A, as described above.

Figure 8:
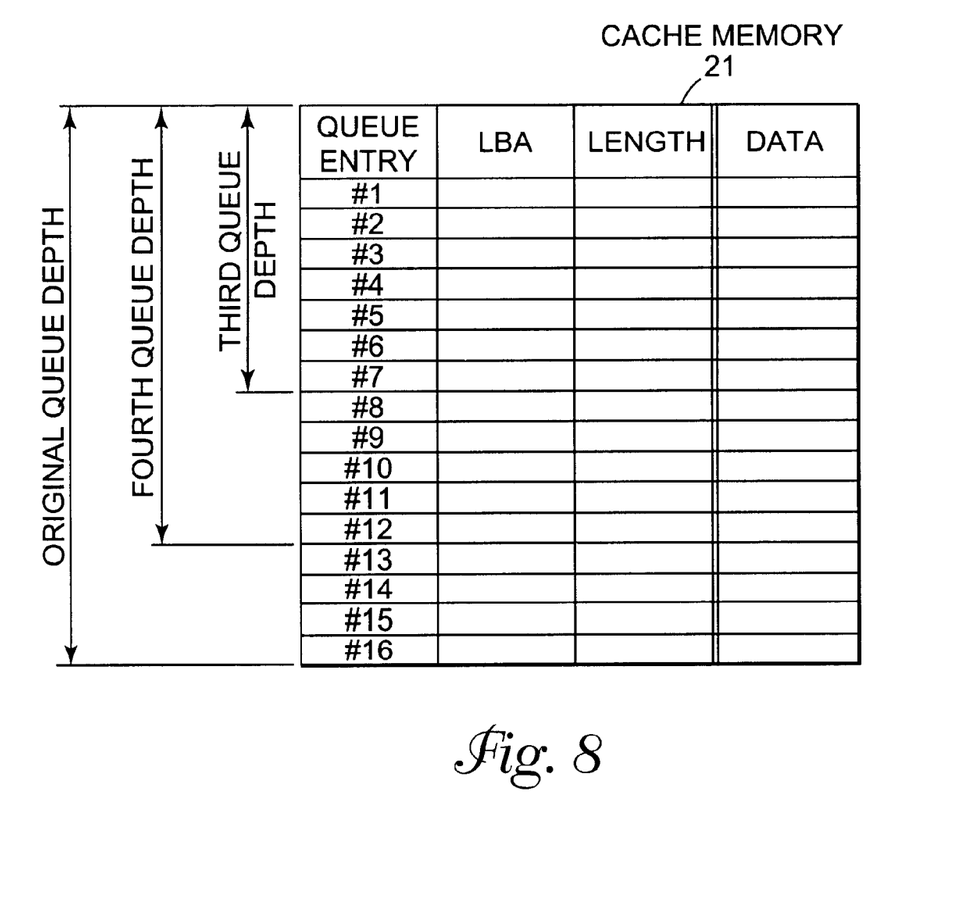
FIG. 8 is an example of content of the cache memory in the operation in accordance with the present invention.

Next, an operation started by the answer YES of the block 33 shown in FIG. 3 is described with reference to FIG. 5. In this case, the operation proceeds to a block 61 in which the MPU 16 determines as to whether any command is received, or not. If the answer of the block 61 is YES, the operation proceeds to a block 62 in which a processing routine for the command is executed. If the command is the write command, the operation returns to the block 33 in FIG. 3. If the answer of the block 61 is NO, the operation proceeds to a block 63 in which the MPU 16 starts an idle mode. In the idle mode, various data, such as the current error rate, are recorded in the rotating data recording disk 10. The operation proceeds to a block 64 in which the MPU 16 determines as to whether the original queue depth including the queue entries #1 through #16 has been decreased, or not. If the answer of the block 64 is NO, it means that the original queue depth including the queue entries #1 through #16 is maintained, and the operation returns to the block 61. It is assumed that the current queue depth found in the block 64 is the third queue depth, described before, including the queue entries #1 through #7, as shown in FIG. 8. The operation proceeds to a block 65 in which the MPU 16 writes test data in a region or sector reserved for the test on the data recording surface 10A. Any sector in an empty state, that is any sector into which the data are not recorded, can be used as this particular sector in the block 65. The operation proceeds to a block 66 in which the MPU 16 determines as to whether the data are recorded in the sector without errors, or not. If the answer of the block 66 is YES, the MPU 16 understands that the cause for decreasing the original queue depth to the third queue depth was a temporary applied shock to the hard disk drive device, and the rotating data recording disk 10 now rotates without the NRRO or the RRO, and every thing in the hard disk drive device now normally operates without errors. As described before, the NRRO means that the rotating data recording disk 10 is irregularly swung due to a trouble of the spindle motor 13, and the RRO means that the rotating data recording disk 10 is regularly and eccentrically swung due to a trouble of the spindle motor 13. The operation proceeds to a block 67 in which the MPU 16 increases the current queue depth by a predetermined amount, such as five queue entries, so that the current or third queue depth is changed to a fourth queue depth, as shown in FIG. 8. If the answer of the block 66 is NO, it means that some causes for decreasing the original queue depth to the current or third queue depth still exists, and the operation returns to the block 61.

As apparent from the above description, the idle mode is started when a command to be executed does not exist, and in the idle mode, the MPU 16 determines the current queue depth, and if the current queue depth differs from the original queue depth, the MPU 16 writes the test data in a sector for a test of the data recording surface 10A. And, the MPU 16 analyzes as to whether the functions of the hard disk drive device have been recovered from a bad condition, or not. If the functions have been recovered, the MPU 16 gradually increases the current queue depth towards the original queue depth.

As described before, in the patent application JP-A-8-77728, each time a write command is sent from a host processor, a cache monitor circuit monitors various parameters to determine as to whether the write cache mode should be turned ON or OFF, or not, whereby a command overhead is increased. The present invention makes the decision as to whether the queue depth should be decreased, or not is made when an error(s) is detected at the write operation of the cached data in the rotating data recording disk 10, whereby the present invention avoids the problem of the increase of the command overhead in the JP-A-8-77728. is solved. The present invention improves the efficiency of the write cache operation since the number of the queue entries to be used in the write cache mode can be gradually decreased from the number K by a predetermined number, and the number of the queue entries to be used in the write cache mode can be gradually increased from a decreased number towards the number K by a predetermined number, in response to values of parameters, such as an error rate and the NRRO or RRO of the rotating data recording disk at writing data from the cache memory to a rotating data recording disk.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for controlling a disk drive device containing a rotating data recording disk and a cache memory which includes K queue entries (K is an integer) for storing data sent from a host processor comprising:
   (a) detecting that N queue entries in said cache memory store said data (wherein N is equal to or smaller than K, and N is an integer),
   (b) successively writing said data stored in said N queue entries into said rotating data recording disk,
   (c) detecting that an error rate at said writing of said data exceeds a predetermined level, and
   (d) decreasing said K queue entries by a predetermined number X, wherein X is equal to or less than K−N, and X is an integer.

2. A method for controlling a disk drive device according to claim 1, wherein said detecting detects than an error rate at said writing of said data exceeds a predetermined level, and that Non Repeatable Run Out or Repeatable Run Out of said rotating data recording disk at said writing of said data exceeds a predetermined level.

3. A method for controlling a disk drive device according to claim 1, further comprising:
   (a) detecting that a command to be processed does not exist, and starting an idle mode, wherein said idle mode comprises:
      (i) detecting that the said K queue entries are decreased by at least said predetermined number X,
      (ii) writing test data in a region for test in said rotating data recording disk,
      (iii) detecting that said writing of said test data succeeds, and
      (iv) increasing the number of said decreased queue entries by a predetermined number.

4. A method for controlling a disk drive device according to claim 3, wherein said (i) through (iv) are repeated until the number of said deceased queue entries are restored to ssaid K queue entries.

5. A method for controlling a disk drive device according to claim 3, wherein said detecting detects that an error rate at said writing of said data exceeds a predetermined level, and that Non Repeatable Run Out or Repeatable Run Out of said rotating data recording disk at said writing of said data exceeds a predetermined level.

6. A method for controlling a disk drive device containing a rotating data recording disk and a cache memory which includes K queue entries, wherein, K is an integer for storing data sent from a host processor comprising:
   (a) detecting that at least one queue entry in said cache memory stores said data,
   (b) writing said data stored in said queue entry into said rotating data recording disk,
   (c) detecting an occurrence of error at said writing of said data,
   (d) performing one of error recovery steps for said data, and rewriting said data into said rotating data recording disk,
   (e) detecting that an error rate at said rewriting of said data into said rotating data recording disk exceeds a predetermined level, and
   (f) decreasing said K queue entries by a predetermined number X, wherein X is equal to or less than K−N, N is the number of queue entries into which said data are stored, and N and X are integer.

7. A method for controlling a disk drive device according to claim 6, wherein said detecting an error rate detects that an error rate at said rewriting of said data exceeds a predetermined level, and that Non Repeatable Run Out or Repeatable Run Out of said rotating data recording disk at said rewriting of said data exceeds a predetermined level.

8. A method for controlling a disk drive device containing a rotating data recording disk and a cache memory which includes a plurality of queue entries for storing data sent from a host processor, to operate in a write cache mode comprising:
   (a) detecting that at least one queue entry in said cache memory stores said data,
   (b) writing said data stored in said queue entry into a target sector of said rotating data recording disk,
   (c) detecting an occurrence of error at said writing of said data into said target sector,
   (d) performing one of error recovery steps for said data and rewriting said data into said target sector,
   (e) detecting that all error recovery steps are performed for said data, and that said rewriting of said data into said target sector fails,
   (f) writing said data into an alternative sector of said rotating data recording disk,
   (g) detecting that said writing of said data into said alternative sector succeeds,
   (h) detecting that Non Repeatable Run Out or Repeatable Run Out of said rotating data recording disk exceeds a predetermined level, and
   (i) informing said host processor of that a status of said disk drive device is switched to a status in which said disk drive device does not operate in said write cache mode.

9. A method for controlling a disk drive device containing a rotating data recording disk and a cache memory which includes a plurality of queue entries for storing data sent from a host processor, to operate in a write cache mode comprising:
   (a) detecting that at least one queue entry in said cache memory stores said data,
   (b) writing said data stored in said queue entry into a target sector of said rotating data recording disk,
   (c) detecting an occurrence of error at said writing of said data in said target sector,
   (d) performing one of error recovery steps for said data and rewriting said data into said target sector,
   (e) detecting that all error recovery steps are performed for said data, and that said rewriting of said data into said target sector fails,
   (f) writing said data into an alternative sector of said rotating data recording disk,
   (g) detecting that said writing of said data into said alternative sector fails,
   (h) rewriting said data into said target sector,
   (i) detecting that said rewriting of said data into said target sector in said rewriting succeeds and
   (j) informing said host processor of that a status of said disk drive device is switched to a status in which said disk drive device does not operate in said write cache mode.

10. A disk drive device containing a rotating data recording disk and a cache memory which includes K queue entries (K is an integer) for storing data sent from a host processor comprising:

(a) a detector for detecting that N queue entries in said cache memory store said data (wherein N is equal to or smaller than K, and N is an integer), (b) a write circuit for successively writing said data stored in said N queue entries into said rotating data recording disk, (c) an error rate detector for detecting that an error rate at said writing of said data exceeds a predetermined level, and (d) a subtractor for decreasing said K queue entries by a predetermined number X, wherein X is equal to or less than K−N, and X is an integer.

11. A disk drive device according to claim 10, wherein said error rate detector detects that an error rate at said writing of said data exceeds a predetermined level, and that Non Repeatable Run Out or Repeatable Run Out of said rotating data recording disk at said writing of said data exceeds a predetermined level.

12. A disk drive device according to claim 10 further comprising:

(a) a command detector for detecting that a command to be processed does not exist, and starting an operation of an idle mode means, wherein said idle mode circuit comprises:

(i) a K queue detector for detecting that the said K queue entries are decreased by at least said predetermined number X, (ii) a test date write device for writing test data in a region for test in said rotating data recording disk, (iii) a success detector for detecting that said writing of said test data succeeds, and (iv) an incrementor for increasing the number of said decreased queue entries by a predetermined number.

13. A disk drive device according to claim 12, wherein operation of said (i) K queue detector through (iv) incrementor continuously until the number of said decreased queue entries are restored to said K queue entries.

14. A disk drive device according to claim 12, wherein said error rate detector (c) detects that an error rate at said writing of said data exceeds a predetermined level, and that Non Repeatable Run Out or Repeatable Run Out of said rotating data recording disk at said writing of said data exceeds a predetermined level.

15. A disk drive device containing a rotating data recording disk and a cache memory which includes K queue entries, wherein K is an integer, for storing data sent from a host processor comprising:

(a) a detector for detecting that at least one queue entry in said cache memory stores said data, (b) a write circuit for writing said data stored in said queue entry into said rotating data recording disk, (c) an error detector for detecting an occurrence of error at said writing of said data, (d) an error recovery device for performing one of error recovery steps for said data, and rewriting said data into said rotating data recording disk, (e) an error rate detector for detecting that an error rate at said rewriting of said data into said rotating data recording disk exceeds a predetermined level, and (f) a subtractor for decreasing said K queue entries by a predetermined number X, wherein X is equal to or less than K−N, N is the number of queue entries into which said data are stored, and N and X are integer.

16. A disk drive device according to claim 15, wherein said error rate detector detects that an error rate at said rewriting of said data exceeds a predetermined level, and that Non Repeatable Run Out or Repeatable Run Out of said rotating data recording disk at said rewriting of said data exceeds a predetermined level.

17. A disk drive device containing a rotating data recording disk and a cache memory which includes a plurality of queue entries for storing data sent from a host processor, to operate in a write cache mode comprising:

(a) a detector for detecting that at least one queue entry in said cache memory stores said data, (b) a write device for writing said data stored in said queue entry into a target sector of said rotating data recording disk, (c) a error detector for detecting an occurrence of error at said writing of said data into said target sector, (d) an error recovery circuit for performing one of error recovery steps for said data and rewriting said data into said target sector, (e) an error recovery detector for detecting that all error recovery steps are performed for said data, and that said rewriting of said data into said target sector fails, (f) an alternative writing device for writing said data into an alternative sector of said rotating data recording disk, (g) an alternative detector for detecting that said writing of said data into said alternative sector succeeds, (h) a threshold detector for detecting that Non Repeatable Run Out or Repeatable Run Out of said rotating data recording disk exceeds a predetermined level, and (i) a sensor for informing said host processor of that a status of said disk drive device is switched to a status in which said disk drive device does not operate in said write cache mode.

18. A disk drive device containing a rotating data recording disk and a cache memory which includes a plurality of queue entries for storing data sent from a host processor, to operate in a write cache mode comprising:

(a) a detector for detecting that at least one queue entry in said cache memory stores said data, (b) a write circuit for writing said data stored in said queue entry into a target sector of said rotating data recording disk, (c) a error detector for detecting an occurrence of error at said writing of said data in said target sector, (d) a error recovery circuit for performing one of error recovery steps for said data and rewriting said data into said target sector, (e) an error recovery detector for detecting that all error recovery steps are performed for said data, and that said rewriting of said data into said target sector fails, (f) an alternative write device for writing said data into an alternative sector of said rotating data recording disk, (g) an alternative detector for detecting that said writing of said data into said alternative sector fails, (h) a rewrite device for rewriting said data into said target sector, (i) a rewrite detector for detecting that said rewriting of said data into said target sector in said step (h) succeeds, and (j) a sensor for informing said host processor of that a status of said disk drive device is switched to a status in which said disk drive device does not operate in said write cache mode.

19. A method for controlling a memory device containing a data recording medium and a cache memory which includes K queue entries, wherein K is an integer for storing data sent from a host processor comprising:
- (a) detecting that N queue entries in said cache memory store said data, wherein N is equal to or smaller than K, and N is an integer,
- (b) successively writing said data stored in said N queue entries into said data recording medium,
- (c) detecting that an error rate at said writing of said data exceeds a predetermined level, and
- (d) decreasing said K queue entries by a predetermined number X, wherein X is equal to or less than K−N, and X is an integer.

20. A memory device containing a data recording medium and a cache memory which includes K queue entries (K is an integer) for storing data sent from a host processor comprising:

- (a) a detector for detecting that N queue entries in said cache memory store said data, wherein N is equal to or smaller than K, and N is an integer,
- (b) a write circuit for successively writing said data stored in said N queue entries into said data recording medium,
- (c) an error rate detector for detecting that an error rate at said writing of said data exceeds a predetermined level, and
- (d) a subtractor for decreasing said K queue entries by a predetermined number X, wherein X is equal to or less than K−N, and X is an integer.

* * * * *

UNITED STATES PATENT AND TRADEMARK OFFICE
CERTIFICATE OF CORRECTION

PATENT NO.    : 6,289,416 B1
DATED         : September 11, 2001
INVENTOR(S)   : Fukushima et al.

It is certified that error appears in the above-identified patent and that said Letters Patent is hereby corrected as shown below:

<u>Column 13,</u>
Line 20, "than" should read -- that --
Line 41, "ssaid" should read -- said --

Signed and Sealed this

Nineteenth Day of August, 2003

JAMES E. ROGAN
*Director of the United States Patent and Trademark Office*